Patented Oct. 18, 1927.

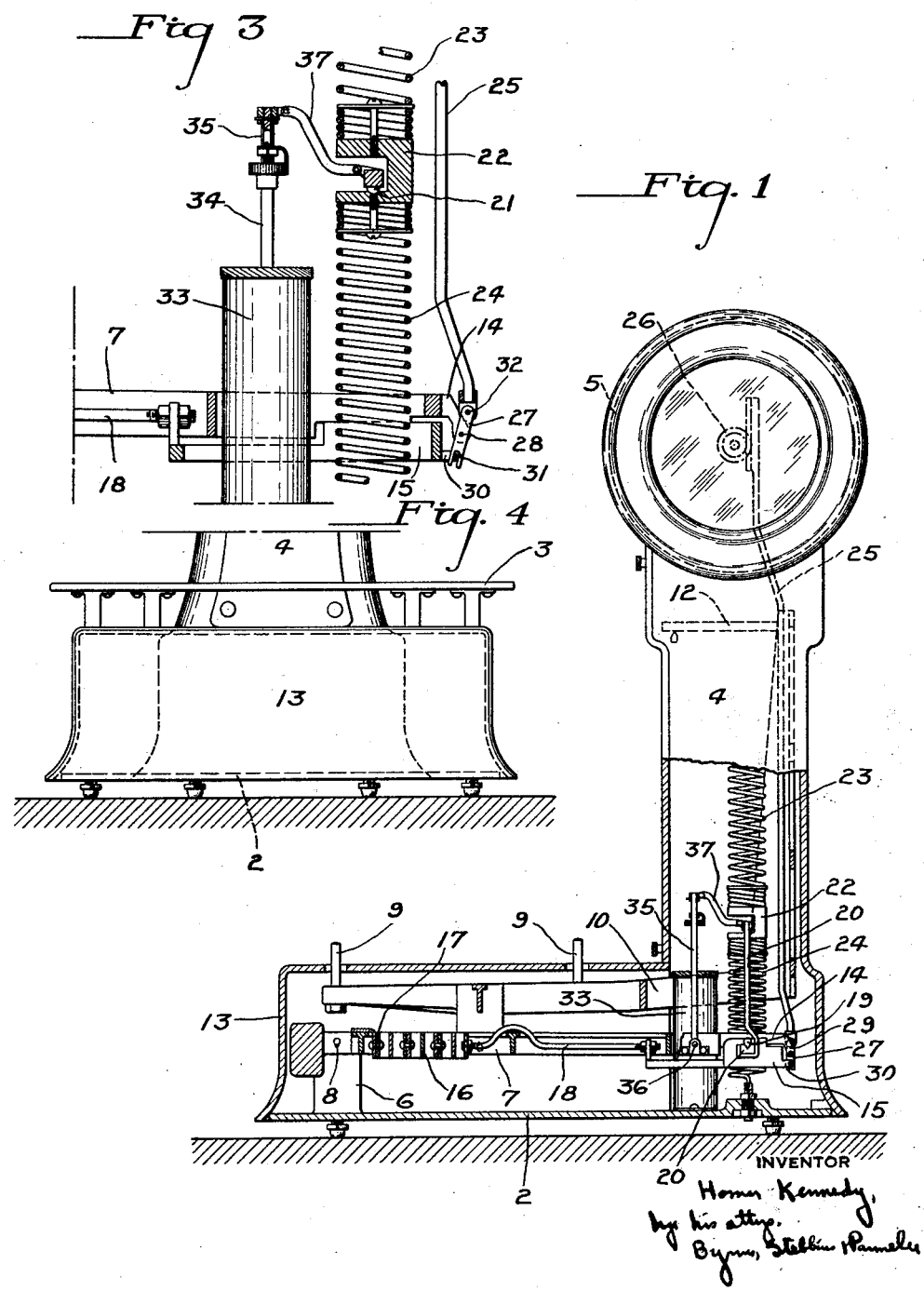

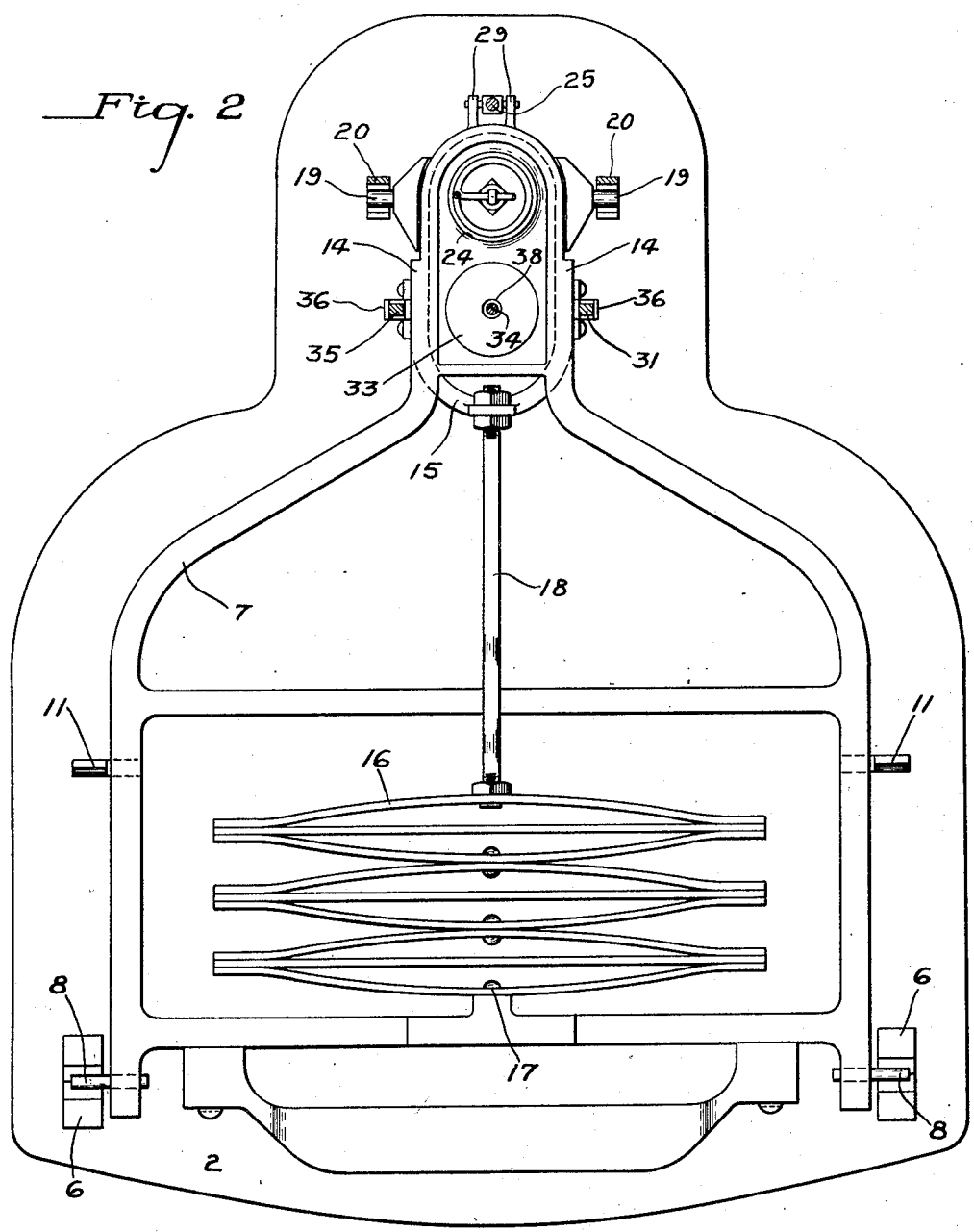

1,646,151

UNITED STATES PATENT OFFICE.

HOMER KENNEDY, OF PITTSBURGH, PENNSYLVANIA, ASSIGNOR, BY MESNE ASSIGNMENTS, TO LINCOLN SCALE CORPORATION, OF PITTSBURGH, PENNSYLVANIA, A CORPORATION OF DELAWARE.

SCALE.

Application filed April 1, 1927. Serial No. 180,132.

This invention relates to scales. A number of the features thereof are adaptable to scales of various sorts. Certain other features have particular relation to spring scales.

Spring scales require two compensations in order that they shall be accurate under all temperature conditions. The power of the springs decreases with increases in temperature and, therefore, the ratio of the spring lever system relative to the weight indicating mechanism must be changed. In addition to this, the springs expand and contract with temperature changes, thereby tending to disturb the zero setting. Various mechanisms for securing the desired compensation have been employed. Many of them are open to the objection that they are not sturdy enough or that they unduly increase the weight of the moving parts and thereby affect the delicacy of the scale. I provide a compensating mechanism which is sturdy in construction, easily and inexpensively built and positive in operation. I employ a thermostat mounted on a scale lever, a member movable along the lever and having its position controlled by the thermostat and a small lever mounted on the first mentioned lever and actuated by movement of the slidable member. The spring connection to the lever is made through the slidable member, while the indicating mechanism is actuated through the small lever. Preferably the small lever is one of the first class and so connected to the sliding member that as the sliding member moves outwardly on the scale lever, the point of attachment of the indicating mechanism moves inwardly. In this manner the "ratio" compensation is readily attained. The small lever is so short that the zero compensation is also attained by reason of the fact that the point where the indicating mechanism is connected moves in an arc.

I further provide a desirable arrangement for the spring dash-pot whereby proper operation of the dash-pot is always attained.

In the accompanying drawings which illustrate the present preferred embodiment of my invention, Figure 1 is a side elevation partly broken away, Figure 2 is a horizontal section to enlarged scale, showing the scale lever in plan and indicating the connection of certain parts, other parts of the scale being removed, Figure 3 is a view to enlarged scale of a portion of Figure 1, and Figure 4 is an end view of the scale base and platform.

In the drawings there is shown a scale comprising a base 2, a platform 3 and a column 4 whose upper end is shaped to receive an indicating drum 5 of the usual type. The base 2 is provided with posts 6 on which a main lever 7 is pivoted, as indicated at 8. The platform 3 is mounted on posts 9 projecting upwardly from a check arm 10. The check arm is carried on knife edges 11 formed on the main lever 7 and is also supported by a check link 12 in the column 4. A cover 13 is provided for the lever mechanism. This cover may be removed without disturbing the working parts of the scale, thereby making adjustment easy.

The main lever 7 is provided with an extension comprising a pair of spaced apart portions 14. A block 15 having a relatively large opening therethrough is arranged below the spaced members 14 and bears against the undersides thereof. This block is slidable toward or away from the pivot points 8. Its position is controlled by a thermostat 16 secured to the main lever at 17, and connected to the block by a rod 18. If the temperature increases the thermostat is effective for moving the block outwardly away from the pivot point 8. If the temperature decreases the block is moved inwardly toward the pivot point 8.

The block 15 carries a knife edge 19 at each side and a yoke 20 is engaged by these knife edges. The yoke 20 has a ball and socket connection 21 with a block 22 to which the load springs 23 and 24 are connected. From the above description it will be seen that if the temperature increases the point of application of the spring load to the lever is moved outwardly, thereby providing a greater lever arm and compensating for the decreased power of the springs. Conversely, if the temperature decreases, the effective lever arm through which the springs act is decreased, thus compensating for the increased power of the springs at lower temperatures.

The indicating drum 5 is actuated by a rack bar 25 engaging a pinion 26 on the shaft of the indicating drum. The rack bar 25 is pivoted at its lower end to a small lever of the first class 27. The lever 27 is pivoted at 28 between forks 29 provided at the extreme outer end of the main lever 7. The block 15 is provided with an extension 30 carrying a pin 31 engaging a slot in the lower arm of the lever 27.

As best shown in Figure 3, the lever 27 is normally so positioned that its upper arm extends outwardly. It follows that when the block 15 moves outwardly the point 32 will move not only inwardly, but also upwardly, and conversely, when the block 15 moves inwardly the point 32 will move outwardly and downwardly. It is this vertical component of movement which gives the desired zero correction for the scale.

As best shown in Figures 2 and 3, the spring 24 extends upwardly between the portions 14 of the main lever. The dash pot 33 of the scale is also located between these extensions. The piston rod 34 of the dashpot is connected to a yoke 35 which is pivoted to the extensions 14 at 36. The yokes 35 and 20 are connected at their upper ends by a link 37. This construction is found in operation to provide a freely working dashpot at all times. The piston rod 34 does not extend through a tight packing, but extends through an opening 38 in the top of the dash-pot, which opening is materially larger than the piston rod 34.

I have illustrated and described the present preferred embodiment of my invention, but it will be understood that it is not limited to this form alone, as it may be otherwise embodied within the scope of the following claims.

I claim:—

1. A scale comprising a lever, a member movable therealong, a load spring connected to the member and having its point of connection movable therewith, a load indicating means operatively connected to the lever, and means for shifting the point of connection of the load indicating means to the lever in a reverse direction to the direction of movement of the first mentioned member.

2. A scale comprising a lever, a member movable therealong, a load spring connected to the member and having its point of connection movable therewith, a lever of the first class pivoted to the first mentioned lever, one arm of said first class lever being connected to the member, and indicating means connected to the other arm.

3. A scale comprising a lever, a member movable therealong, a load spring connected to the member and having its point of connection movable therewith, a lever of the first class pivoted to the first mentioned lever, one arm of said first class lever being connected to the member, and indicating means connected to the other arm, the lever of the first class being so positioned that the point of connection of the indicating means to the lever of the first class has an upward component of movement when the member is moved in one direction, and a downward component of movement when the member is moved in the opposite direction.

4. A scale comprising a lever, a member movable therealong, a load spring connected to the member and having its point of connection movable therewith, a lever of the first class pivoted on the first mentioned member, one arm of the lever of the first class being slotted, means on the movable member engaging the slot, and indicating means connected to the other arm of the lever of the first class.

5. A scale comprising a lever, a member movable therealong, a load spring connected to the member and having its point of connection movable therewith, a load indicating means operatively connected to the lever, means for shifting the point of connection of the load indicating means to the lever in a reverse direction to the direction of movement of the first mentioned member, and temperature responsive means for moving the member along the lever.

6. A scale comprising a lever, a member movable therealong, a load spring connected to the member and having its point of connection movable therewith, a lever of the first class pivoted to the first mentioned lever, one arm of said first class lever being connected to the member, indicating means connected to the other arm, and temperature responsive means for moving the member along the lever.

7. A scale comprising a main lever, a member movable therealong, a load spring connected to the member, indicating means, a rack bar for operating the same, and means for moving the point of connection of the rack bar with the lever in a reverse direction to the direction of movement of the movable member.

8. A scale comprising a lever, a load spring, a dash-pot having a piston rod, a yoke connecting the lever to the load spring, a yoke connecting the dash-pot piston rod to the lever, and a link connecting said yokes.

9. A scale comprising a lever having spaced apart portions, a load spring arranged between such portions, a dash-pot arranged between said portions, a yoke engaging the spring and making operative connection with the spaced apart portions, a yoke pivoted to the dash-pot mechanism and operatively connected to the spaced apart portions, and a link connecting the yokes.

In testimony whereof I have hereunto set my hand.

HOMER KENNEDY.